United States Patent [19]
Greenwood

[11] 3,865,140
[45] Feb. 11, 1975

[54] SOLENOID-OPERATED, THREE-WAY FUEL VALVE WITH PRESSURE BALANCING

[75] Inventor: Roger Greenwood, Northridge, Calif.

[73] Assignee: International Telephone and Telegraph Corporation, New York, N.Y.

[22] Filed: Aug. 22, 1973

[21] Appl. No.: 390,484

[52] U.S. Cl.......................... 137/625.64, 137/625.65
[51] Int. Cl............................................ F15b 13/044
[58] Field of Search....... 137/596.16, 625.6, 625.64, 137/625.65; 251/38, 43

[56] References Cited
UNITED STATES PATENTS

| | | | |
|---|---|---|---|
| 2,363,111 | 11/1944 | Bennett | 137/625.64 |
| 2,965,132 | 12/1960 | Couffer et al. | 137/625.64 |
| 3,458,769 | 7/1969 | Stampfli | 137/625.64 |
| 3,677,298 | 7/1972 | Greenwood et al. | 137/625.64 |
| 3,747,623 | 7/1973 | Greenwood et al. | 137/625.65 X |
| 3,805,837 | 4/1974 | Stampfli | 137/625.6 |

Primary Examiner—Alan Cohan
Assistant Examiner—Gerald A. Michalsky
Attorney, Agent, or Firm—A. Donald Stolzy

[57] ABSTRACT

A three-way normally closed solenoid-operated valve particularly adapted for liquid fuel control. Fuel under pressure is passed from a source to a utilization device when the valve is open and the port connected to the utilization device is drained back (to the fuel tank, for example) when the valve is closed.

A tandem valving operation is employed, the solenoid pulling thrust operating to open a third valving orifice to initiate a hydraulic assist feature on valve opening. A positive mechanical connection engages the tandem valving means on a lost motion basis after the third orifice is opened. An arrangement of bleed holes provides for hydraulic balancing and eliminates trapped fuel volumes within the valve which otherwise would impede valve closing.

9 Claims, 3 Drawing Figures

PATENTED FEB 1 1 1975

SOLENOID-OPERATED, THREE-WAY FUEL VALVE WITH PRESSURE BALANCING

BACKGROUND OF THE INVENTION

1. Field of the Invention

The invention relates generally to electrically-operated fluid control valves, and more particularly, to valves of the solenoid-controlled type, in which fluid balancing is employed to reduce the required solenoid thrust.

2. Description of the Prior Art

Solenoid-operated valves are, of themselves, well known and have been used in a number of forms. The valving of fluids of both liquid and gaseous types can be effectively handled by such devices where remote or programmed automatic control is involved.

The term "three-way valve," as used in connection with the present invention, implies that the fluid is passed from an inlet to an outlet when the valve is open, and when the valve is closed, the inlet is sealed off and a drain-back path is opened up from the outlet of the valve. A valve fitting this general description is described in U.S. Pat. No. 3,677,298.

The novel aspects of the solenoid valve of the present invention will be understood as this description proceeds. Many prior art solenoid valves require excessively high solenoid thrust where high fluid pressures are involved. However, the unique combination of the present invention permits operation with minimal solenoid thrust and, therefore, minimum electric power consumption for opening and for "hold open" during operation.

SUMMARY OF THE INVENTION

In accordance with the aforementioned state of the art, it may be said to be the general object of the present invention to develop a three-way, normally closed solenoid valve which employs a fluid balancing system. A unique arrangement of internal fluid transfers, through predetermined orifices during the opening and closing processes, permits efficient design. Without the "balancing out" feature of the valve of the present invention, a comparable size and comparably powered valve might be expected to operate against a maximum fluid pressure on the order of 100 pounds per square inch. With the balanced poppet restriction and two tandem movable seats on a hollow vented stem, as employed in the present invention, the operating pressure may be increased to a value on the order of 750 pounds per square inch for the same solenoid thrust.

A small amount of axial "lost motion" is incorporated into the linkage between the solenoid plunger and the poppet assembly. This lost motion serves to permit the solenoid plunger to gain a certain amount of velocity to provide a jogging action. The mechanical linkage which includes this "lost motion" also serves to provide a positive mechanical connection so that the solenoid may operate at zero pressure as well as the high fluid inlet pressures for which it is designed. That is, as is the case with many prior art solenoid-operated valves designed for high pressure operation, the operation of the valve depends upon the interplay of hydraulic forces during normal operation, but when little or no pressure is present, the present valve can still be opened by the solenoid.

The manner in which the unique combination of the present invention serves the objective will be evident as this description proceeds.

DESCRIPTION OF THE PREFERRED EMBODIMENT

Figure 1:
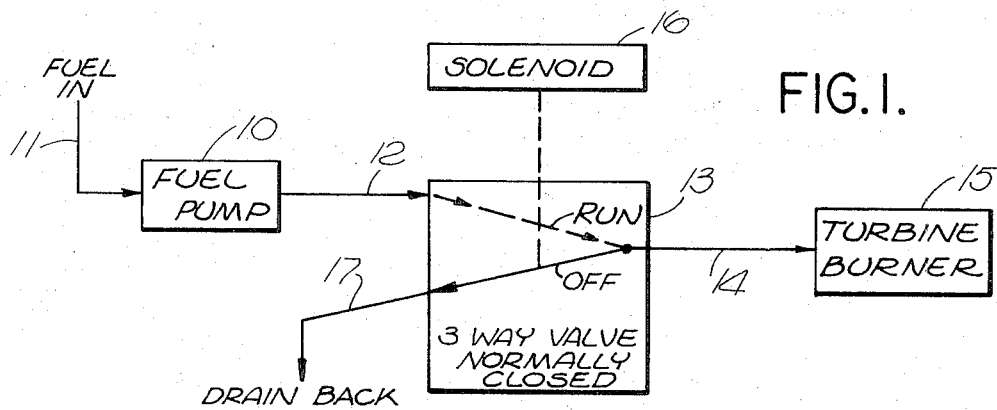
FIG. 1 is a block diagram illustrating the schematic function of the three-way valve in accordance with the present invention and also illustrating its utility in a typical combination where it is used as a liquid fuel control valve.

Referring now to FIG. 1, a schematic block diagram illustrating the functional or controlling equivalent diagram of the three-way valve itself is presented. FIG. 1 also shows how the valve, according to the invention, might typically be utilized as a liquid fuel control valve in an internal combustion turbine system.

In a system as aforesaid, a fuel pump 10 is commonly employed and draws fuel from an input 11 and supplies it under high pressure to a valve inlet 12. The valve according to the invention is described in this preferred embodiment as "normally closed," and the meaning of that designation is evident from inspection of the valve schematic block 13. In the designated "run" position, the valve 13 is to be considered open, and the high pressure fuel from the inlet 12 is passed directly along line 14 to the turbine burner 15. It will be realized, of course, that the use of a turbine burner 15 is, by way of example only; any of a number of utilization devices might be involved in using the valve 13. In the said "run" position, the solenoid 16 is energized. Once 16 is deenergized, the valve 13 reverts to the "off" position sealing off or closing the inlet 12 and permitting the line 14 to drain back via drain-back line 17 into a reservoir or fuel tank, which may actually be the same vessel as the source of fuel into 11.

Figure 2:
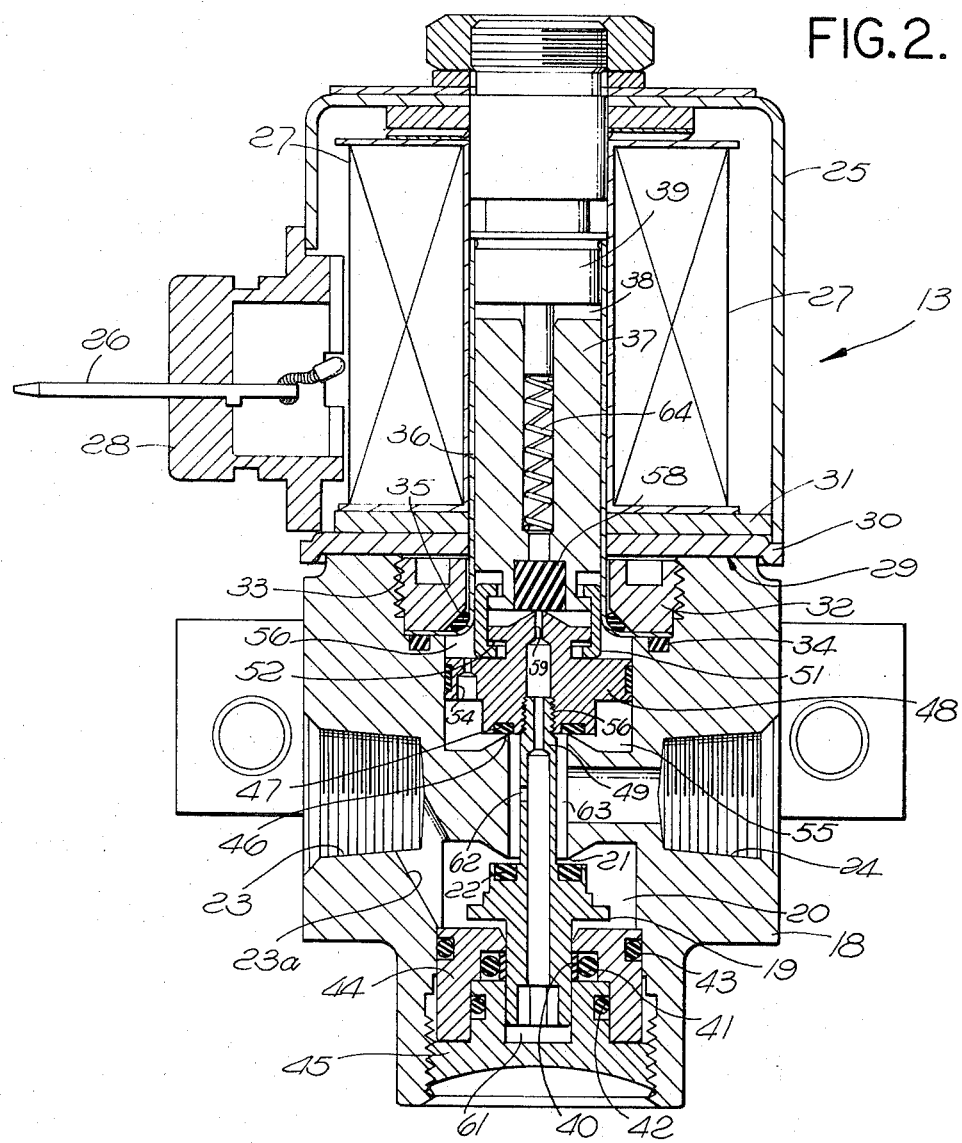
FIG. 2 is a sectional view of the valve according to the invention shown in the closed position.

Referring now to FIG. 2, the valve of the present invention is shown in section, the sectioning plane containing the axial center line of the device. A valve body 18 consists of a machinable metal member. A transverse sectioning plane, if passed through the view of FIG. 2, might show the perimeter of this body member 18 to be circular, rectangular or some other shape. However, the internal bores and the plunger and piston members, which will hereinafter be described, are of circular cross section as would be expected in a device of this type because of manufacturing considerations.

A poppet assembly 19 translates axially to operate the valve orifice between the machined seat 21 in 18, and the washer 22, the latter carried by poppet assembly 19.

Since, as previously indicated, the valve in FIG. 2 is in its normally closed position, this valve orifice between 21 and 22 constitutes the "drain-back" path between 14 and 17 on FIG. 1. The output connection 24 would connect to line 14 of FIG. 1, and the connection 23 of FIG. 2 constitutes the outlet or drain-back connection 17 of FIG. 1.

The electrical solenoid generally comprises the parts within the jacket 25. An electrical lead 26 provides for an electrical current to be applied to the generally cylindrical electrical magnet coil 27. Lead 26 may actually be a pair of wires to complete the circuit through the electrical coil 27, or it may be a single lead connecting to one end of the coil 27; the other coil terminal then being grounded to the metal jacket 25 and body 18. The part 28 is an ordinary terminal block to facilitate the electrical connection 26.

The solenoid subassembly joins the valve body 18 at 29, washers 30 and 31 facilitating this connection.

A solenoid base piece in the general shape of an externally threaded annular ring 32 provides a solenoid base, a threaded engagement 33 into the body 18 serving to secure part 32 therein. A square seal 34 serves to provide a fluid tight joint for operating with the aforementioned threaded engagement. An O-ring 35 on the upper side of the flange portion of the plunger tube 36 is subjected to compression in assembly to seal the solenoid-to-valve body connection at that point.

A two part end sealing assembly comprises plug 44 and cap 45. These parts are sealed to each other in respect to fluid pressure and to the valve body 18 by O-rings 42 and 43, respectively. The O-ring 41 serves to back up the teflon slipper seal 40 so that a fluid tight seal with a high degree of slidability of the poppet assembly 19 within the slipper seal 40 is maintained.

The techniques and materials used for the actual construction of valves of the general type herein described are themselves relatively well known to those skilled in this art. The same may be said for the materials and the engineering criteria involved in the construction of a solenoid valve, per se. For example, it is well known to construct the plunger 37 and the fixed solenoid core member 39 from materials having low magnetic reluctance and low retentivity so that during energization of the coil 27, a magnetic flux appears across a gap 38.

Figure 3:
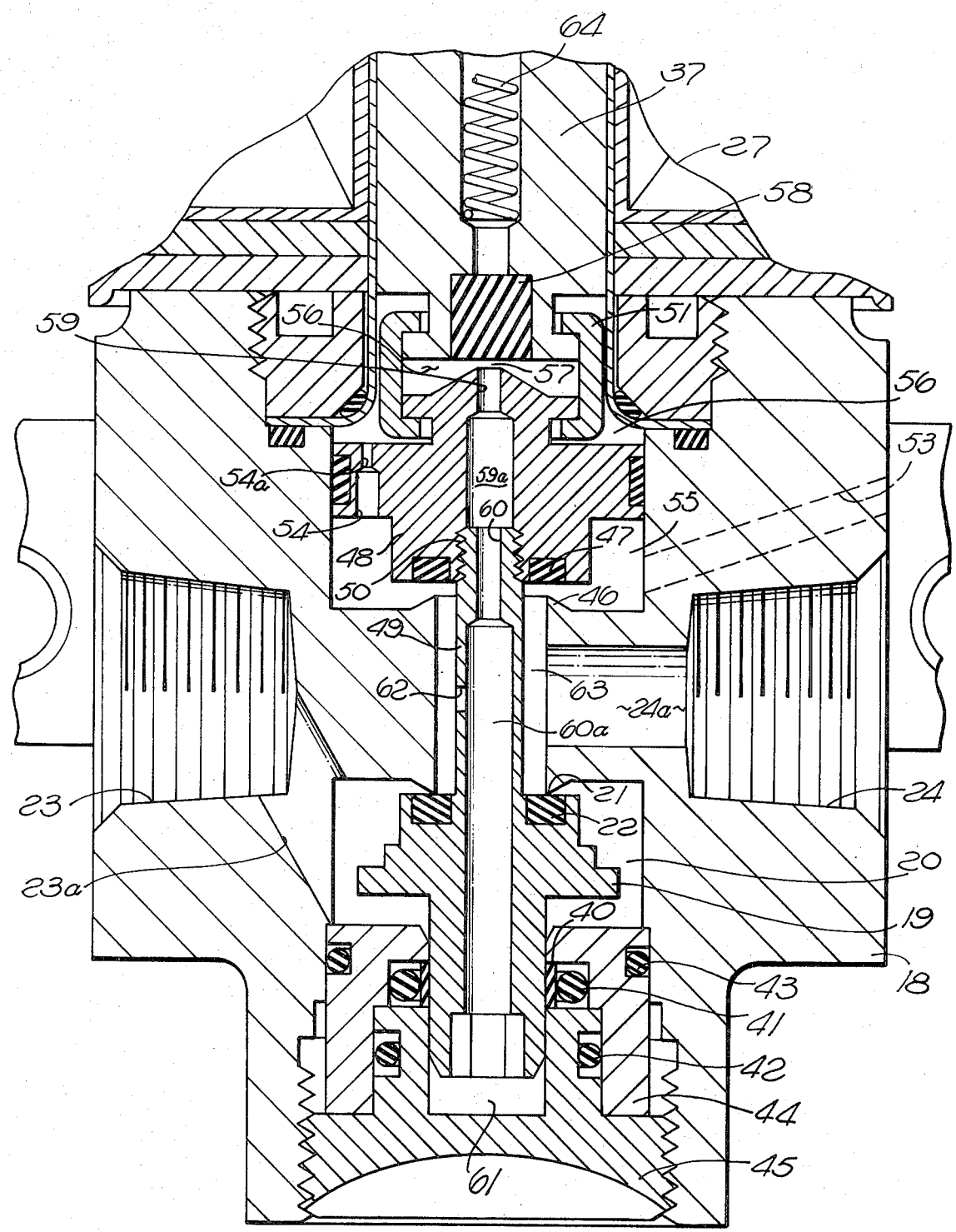
FIG. 3 is a somewhat magnified sectional view of the valve of FIG. 2, with most of the solenoid structure omitted and showing the valve in the open position.

The further description of the structure and operation of the valve in accordance with the present invention will be undertaken with reference to FIG. 3 as well as FIG. 2.

An upper valve orifice is produced by the valve seat 46 in cooperation with the washer 47, the former being a fixed part of the body 18 and the latter being carried by the piston assembly 48. The piston 48 is mated by a screw thread connection 50 to a poppet tube or stem portion 49 of poppet assembly 19.

Let it be assumed that the valve has been at rest, i.e. in the closed or off position as depicted in FIG. 1, for a relatively long period of time. To place the system with which the valve is used into operation, the solenoid coil 27 is electrically energized. The flux thus produced across the gap 38 tends to pull the plunger 37 upward. At least one piston pick-up clip 51 engages a circumferential groove in the lower portion of the plunger 37 and also engages underneath the flanged head of the piston 48. In FIG. 2, it will be noted that there is a gap 52 between these members 51 and the piston flange surface. As the plunger 37 draws up in response to the magnetic field within the solenoid, this gap 52 is closed. FIG. 3 depicts that relationship clearly. Whatever fluid remains in the chamber 55 will be under the same pressure as that in 56, the said pressure having had ample time to equalize through the bleed orifice 54a.

The initial lifting of the plunger 37 produces a small gap 57 between the sealing member 58 and the coaxial cylinder orifice 59. The parts 58 and 59 may be thought of as a hydraulic assist control valve arrangement. The upper and lower valve orifices are between 46 and 47 and between 21 and 22, respectively.

At this point, it should be mentioned that an inlet for fuel under pressure is dotted in at 53, only on FIG. 3 for clarity. Actually, such a path is formed by a hole through the body 18 at some place around the transverse plane perimeter of the valve body. In one successful implementation of the valve of the present invention this inlet was placed at 90 degrees from both 23 and 24, i.e. such that it would project out from the plane of the paper in FIG. 2 or FIG. 3. Structurally and functionally, the important fact is that 53 represents an inlet for fuel under pressure corresponding to 12 on FIG. 1, and that this fuel is admitted to the annular chamber 55. Since the bleed orifice 54, and particularly its smallest diameter 54a, is designed as an intentional restriction on flow from chamber 55 to chamber 56, the initial opening of the gap 57 drains fluid under pressure down through the cylinder and poppet center bores 59, 59a, 60 and 60a toward the closed chamber 61. The initial upward thrust of the plunger 37 is against only a force represented by the product of the fluid pressure and the diameter of the orifice or cylinder center bore 59 (typically on the order of 0.04 inches). Thus, the solenoid is only required to overcome a relatively small initial force. Once the relief of this pressure through 59 is achieved (59 is a considerably larger opening than 54a), a differential in pressure between cavities 55 and 56 is temporarily extant, the larger pressure being in 55. This provides upward hydraulic assist to 48. The next event in the sequence of the opening operation is the closing of the gap 52 as the clip (or clips) 51 comes into contact with the flanged head of the piston 48 closing the gap 52 (FIG. 2). This immediately begins to open the upper valve orifice between 46 and 47 during the same period of time that chamber 61 tends to become filled and an upward hydraulic thrust against poppet assembly 19 occurs from that point. The lower valve assembly (i.e. between 21 and 22) is thus contemporaneously closed. The effect of closing the valve orifice between 21 and 22 is to close the drain (17 of FIG. 1). The function of the upper valve comprising 46 and 47, which is now open in accordance with FIG. 3, is to join the inlet 53 through the chamber 55 with the outlet 24 (corresponding to 14 of FIG. 1).

The expression "hydraulic assist" in the context herein used, means that the hydraulic pressure differentials among various parts of the valve assembly (as already indicated) produces forces which tend to accelerate the operation of the valve. Actually, these forces may be much greater than the thrust produced by the solenoid at least during parts of the operation cycle. The relative sizes of the orifices 54a and 59 tend to control the time constants involved in opening and closing of the valve. As already indicated, the pressure differential in the chamber 56 in the initial stages of valve opening as compared to the higher pressures in chambers 55 and 50 produces a net hydraulic lifting force for the piston 48 until such time as a new equilibrium is established through bleed hole 54a. Fluid flowing down through the hollow center bores 59 and 59a of piston 48 and of the poppet assembly comprising bores 60 and 60a fills chamber 61 and that fluid tends to remain trapped there and exerts an upward thrust. The poppet assembly 19 includes an integral sleeve portion 49 (which engages the piston 48 in a screw thread arrangement 50) which not only contains the center bores 60 and 60a but also a lateral bore or relief hole 62. The larger bore in the valve body through which the stem 49 passes, provides a coaxial chamber 63 which, when the valve is closed, is in communication with the drain-back outlet 23 through the valve orifice between 21 and 22 which is open at that time, chamber 20 and the bore 23a connecting 20 and 23. Thus, in the closing process, the fluid otherwise trapped in chamber 61 can be relieved through this hole 62 and thence drained into 23. As previously understood, when the valve is in the closed position, the valve orifice between 46 and 47 is closed as is the orifice between 58 and 59. During the transaction, however, it is important that the trapped fluid in 61 and in the spaces in communication therewith be drainable during the closing process. The gap 57 will be closed before the piston and poppet members achieve full travel toward the closed position. Spring 64 serves to effect more rapid closing of the valve. In accordance with the foregoing, it will be understood that bleed hole 62 performs an important function in the valve closing sequence in an economical and functionally adequate manner.

For any particular application, the sizes of orifices 54a, 59 and 62 are subject to design control in order that the opening and closing time constants of the valve may be predetermined.

It should be pointed out for the sake of clarity that the piston pickup clip or clips 51 are not continuous in an orthogonal sectional plane taken through them in either FIGS. 2 or 3, and accordingly, the cavity 56 includes all the volume between the top wide shoulder of the piston 48 (through which 54a projects) and the bottom of plunger 37.

Those skilled in the art will recognize that variations and modifications may be made within the scope of the invention once it is understood.

Accordingly, it is not intended that the scope of the invention should be limited by the drawings and this description, these being typical and illustrative only.

What is claimed is:

1. A three-way, normally closed fluid valve comprising:

a valve body having first and second chambers therein and a communicating third chamber joining said first and second chambers;

an inlet port including a duct for applying fluid under pressure to said first chamber;

an outlet port for applying said fluid under pressure from said third chamber to a utilization device when said valve is in the open condition, said fluid having passed from said first chamber through said third chamber;

first means including a piston mounted with axial sliding freedom within said first chamber, and a poppet assembly mounted with axial sliding freedom within said second chamber, said first means including a hollow stem having an axial bore, said stem extending axially through said third chamber to mechanically join said piston and said poppet assembly, said bore extending axially through said stem, said poppet and said piston;

a fourth chamber at a second end of said poppet assembly opposite said stem forming a closed cylinder into which said poppet assembly second end may slide, said bore being open to said fourth chamber;

second means operatively associated with said first means and including upper and lower valve orifices, said upper orifice being arranged to be positioned open and said lower orifice being arranged to be positioned closed when said first means is in an axially translated position corresponding to the open position of said three-way valve, said upper orifice being closed and said lower orifice being open when said first means is in an axially translated position corresponding to the closed position of said three-way valve;

third means comprising a bleed hole extending generally axially through said piston to permit fluid flow therethrough at a predetermined rate, thereby joining the portion of said first chamber on either side of said piston;

fourth means for applying a generally axial mechanical force to a first end of said piston of said first means opposite said stem to operate said valve;

fifth means comprising a third valving orifice at said first end of said first means, said fifth means being responsive to said fourth means for draining fluid pressure through said bore from the portion of said first chamber adjacent said piston first end to initiate opening of said three-way valve;

a drain-back port and duct for draining said second chamber externally when said valve is in said closed position;

and sixth means comprising an opening in the wall of said hollow stem within said third chamber, said hole permitting drainage of said bore and said fourth chamber into said third chamber and thereafter into said drain-back port when said three-way valve is in said closed condition.

2. Apparatus according to claim 1 in which said piston and said poppet assembly are slidably mounted within said body by means of seals of self-lubricating material.

3. Apparatus according to claim 1 in which said bleed hole of said third means is defined as having a diameter, through at least a portion of its length, which is substantially less than the least diameter of said axial bore through said piston, stem and poppet assembly, thereby to provide a rate of draining of said first chamber volume adjacent said piston first end greater than the rate of filling through said bleed hole from the remainder of said first chamber.

4. Apparatus according to claim 3 in which said fourth means comprises a source of bi-directional mechanical thrust connected directly to said fifth means, and in which a lost motion mechanical coupling is included to transmit said thrust to said first means after said fifth means has opened at least partially upon initiation of the opening operation of said valve.

5. Apparatus according to claim 4 in which said source of mechanical thrust comprises an electromagnetic solenoid device for producing a pulling thrust applied to said first means corresponding to said opening operation.

6. Apparatus according to claim 1 in which said fourth means comprises a source of bi-directional mechanical thrust connected directly to said fifth means, and in which a lost motion mechanical coupling is included to transmit said thrust to said first means after said fifth means has opened at least partially upon initiation of the opening operation of said valve.

7. Apparatus according to claim 6 in which said source of mechanical thrust comprises an electromagnetic solenoid device for producing a pulling thrust applied to said first means corresponding to said opening operation.

8. Apparatus according to claim 7 in which said lost motion coupling includes at least one piston pick-up clip, said solenoid includes a plunger mechanically connected for transmitting said thrust to said first means, and said clip is adapted to engage a portion of said piston only after said plunger has travelled a predetermined distance in response to said pulling thrust.

9. Apparatus according to claim 8 in which said solenoid device also includes a spring arranged to return said plunger and, therefore, said first means to a position corresponding to closure of said valve upon interruption of said pulling thrust.

* * * * *